United States Patent
Cai et al.

(10) Patent No.: US 9,002,327 B2
(45) Date of Patent: Apr. 7, 2015

(54) METHOD AND DEVICE FOR PROVIDING USER EQUIPMENT WITH VOICE MESSAGES

(75) Inventors: Yigang Cai, Naperville, IL (US); Xiangyang Li, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 226 days.

(21) Appl. No.: 13/514,816

(22) PCT Filed: Dec. 10, 2009

(86) PCT No.: PCT/CN2009/075467
§ 371 (c)(1),
(2), (4) Date: Jun. 8, 2012

(87) PCT Pub. No.: WO2011/069292
PCT Pub. Date: Jun. 16, 2011

(65) Prior Publication Data
US 2012/0252417 A1    Oct. 4, 2012

(51) Int. Cl.
*H04M 11/10* (2006.01)
*H04W 4/16* (2009.01)
*H04M 3/533* (2006.01)

(52) U.S. Cl.
CPC ............ *H04W 4/16* (2013.01); *H04M 3/53308* (2013.01)

(58) Field of Classification Search
CPC ..................... H04M 2203/4563; H04M 3/533; H04M 3/436
USPC ........... 455/413, 414.1, 412, 415, 412.1–417; 370/254, 352–356; 379/88.12, 202.01, 379/88.09
See application file for complete search history.

(56) References Cited

U.S. PATENT DOCUMENTS

| | | | |
|---|---|---|---|
| 5,768,263 A * | 6/1998 | Tischler et al. | 370/263 |
| 5,802,466 A * | 9/1998 | Gallant et al. | 455/413 |
| 6,198,916 B1 * | 3/2001 | Martin et al. | 455/413 |
| 7,424,098 B2 * | 9/2008 | Kovales et al. | 379/76 |
| 7,962,376 B2 * | 6/2011 | Smith et al. | 705/26.3 |
| 8,019,055 B2 * | 9/2011 | Grigoriev et al. | 379/88.17 |
| 8,064,577 B2 * | 11/2011 | Lemieux | 379/88.17 |

(Continued)

FOREIGN PATENT DOCUMENTS

| | | |
|---|---|---|
| CN | 1798166 A | 7/2006 |
| CN | 101010970 A | 8/2007 |

(Continued)

OTHER PUBLICATIONS

International Search Report for PCT/CN2009/075467 dated Sep. 16, 2010.

*Primary Examiner* — Sharad Rampuria
(74) *Attorney, Agent, or Firm* — Fay Sharpe LLP

(57) ABSTRACT

A third UE calls the second UE, however, the second UE is on a call with a first UE, then the call controlling device provides a voice message from said third user equipment as a background voice message to the second user equipment while keeping the call between the first user equipment and the second user equipment. The "background" in the background voice message is relative to the original call, and does not have any other special meanings. Since the original call between the first UE and the second UE is not affected, for the second UE, or a second user that uses the second UE, the voice message from the third UE is a background voice message.

15 Claims, 11 Drawing Sheets

(56) References Cited

U.S. PATENT DOCUMENTS

| | | | |
|---|---|---|---|
| 8,189,748 B2* | 5/2012 | Susama et al. | 379/88.17 |
| 2003/0208754 A1* | 11/2003 | Sridhar et al. | 725/34 |
| 2005/0201534 A1* | 9/2005 | Ignatin | 379/88.22 |
| 2006/0154654 A1* | 7/2006 | Jabbour et al. | 455/417 |
| 2009/0041213 A1 | 2/2009 | Kwon et al. | |
| 2009/0257565 A1 | 10/2009 | Nelson et al. | |
| 2009/0325544 A1* | 12/2009 | Deutsch et al. | 455/413 |

FOREIGN PATENT DOCUMENTS

| | | |
|---|---|---|
| CN | 1010/90570 A | 12/2007 |
| CN | 101247441 A | 8/2008 |
| CN | 1014/04699 A | 4/2009 |
| JP | 2003-244318 | 8/2003 |
| JP | 2005-026734 | 1/2005 |
| KR | 10-2005-0517991 | 9/2005 |
| KR | 100678712 B1 | 2/2007 |
| WO | WO 2009/084528 | 7/2009 |

* cited by examiner

METHOD AND DEVICE FOR PROVIDING USER EQUIPMENT WITH VOICE MESSAGES

FIELD OF THE INVENTION

The invention relates to a method and device for providing user equipment with voice messages.

BACKGROUND OF THE INVENTION

When the calling party calls a called party, if the called party is on a call (also called as busy), then the call from the calling party will be rejected or the call from the calling party will be forwarded by the call controlling device, for example, the telephony application server (TAS) or switch, in the network to the voice message server (VMS) of the called party, so that the calling party can send a voice message to the voicemail box of the called party. The VMS receives and stores the voice message, then the VMS sends a voicemail message waiting indicator to the user equipment (UE) of the called party to prompt the called party to check the voice message. When the call of the called party ends, the called party communicates with the VMS to check the voice message according to the voicemail message waiting indicator from the VMS.

SUMMARY OF THE INVENTION

When a user is on a voice call, a long voice call in particular, for example, a telephone conference, he/she may not be able to check voicemail in his/her voicemail box, and may miss important ones which need immediate action. Aimed at the above mentioned problem, it would be advantageous to propose a technical solution of providing a second user equipment (UE) which is on a call with a first UE with a voice message from a third UE: the third UE calls the second UE, however, the second UE is on a call with a first UE, then the call controlling device provides a voice message from said third UE as a background voice message for the second UE while keeps the call between the first UE and the second UE. The word "background" in the background voice message is just relative to the original call, and does not have any other special meanings. Since the original call between the first UE and the second UE is not affected, for the second UE, or a second user that uses the second UE, the voice message from the third UE is a background voice message.

According to an embodiment of the present invention, there is provided a method, in a call controlling device in telecommunication networks, for providing a second UE which is on a call with a first UE with a voice message from a third UE, comprising: receiving a first request message from said third UE, said first request message configured to request to establish a call between said third UE and said second UE; detecting whether said second UE is on a call with said first UE; and if said second UE is on a call with said first UE, providing a voice message from said third UE as a background voice message for said second UE while keeping said call between said first UE and said second UE.

According to another embodiment of the present invention, there is provided a method, in a voice message server (VMS) in telecommunication networks, for providing a second UE which is on a call with a first UE with a voice message from a third UE, comprising: receiving a third request message from a call controlling device, said third request message configured to request to establish a call between said VMS and said third UE; and sending a sixth request message to said second UE, said sixth request message configured to request to establish a call between said VMS and said second UE.

According to another embodiment of the present invention, there is provided a first providing device in a call controlling device in telecommunication networks, for providing a second UE which is on a call with a first UE with a voice message from a third UE, comprising: a first receiving means configured to receive a first request message from said third UE, said first request message configured to request to establish a call between said third UE and said second UE; a detecting means configured to detect whether said second UE is on a call with said first UE; and a background voice providing means configured to provide a voice message from said third UE as a background voice message fir said second UE while keeping said call between said first UE and said second UE, if said second UE is on said call with said first UE.

According to another embodiment of the present invention, there is provided a second providing device in a VMS in telecommunication networks, for providing a second UE which is on a call with a first UE with a voice message from a third UE, comprising: a second receiving means configured to receive a third request message from a call controlling device, said third request message configured to request to establish a call between said VMS and said third UE; and a second sending means configured to send a sixth request message to said second UE, said sixth request message configured to request to establish a call between said VMS and said second UE. By using the methods and devices provided by the present invention, the second user (corresponding to the second UE) who is on a call with the first user (corresponding to the first UE) can hear the voice message from the third user (corresponding to the third UE) promptly. If the voice message indicates an event with high priority or of great importance, the second user can promptly handle the event indicated by the voice message. Besides, since only the second user can hear the voice message from the third user, while the first user whom the second user is on a call with can not hear the voice message from the third user, the privacy of the second user can be protected. Further, in the technical solution of the present invention, the original call between the first user and the second user is kept, and the first user cannot hear the voice message from the third user; therefore the user experience of the first user is very good.

BRIEF DESCRIPTION OF THE DRAWINGS

Other features, aspects and advantages of the present invention will become obvious by reading the following description of non-limiting embodiments with reference to the appended drawings.

DETAILED DESCRIPTION OF EMBODIMENTS

The illustrative description of the embodiments of the present invention will be given in details combined with FIGS.

Figure 1:
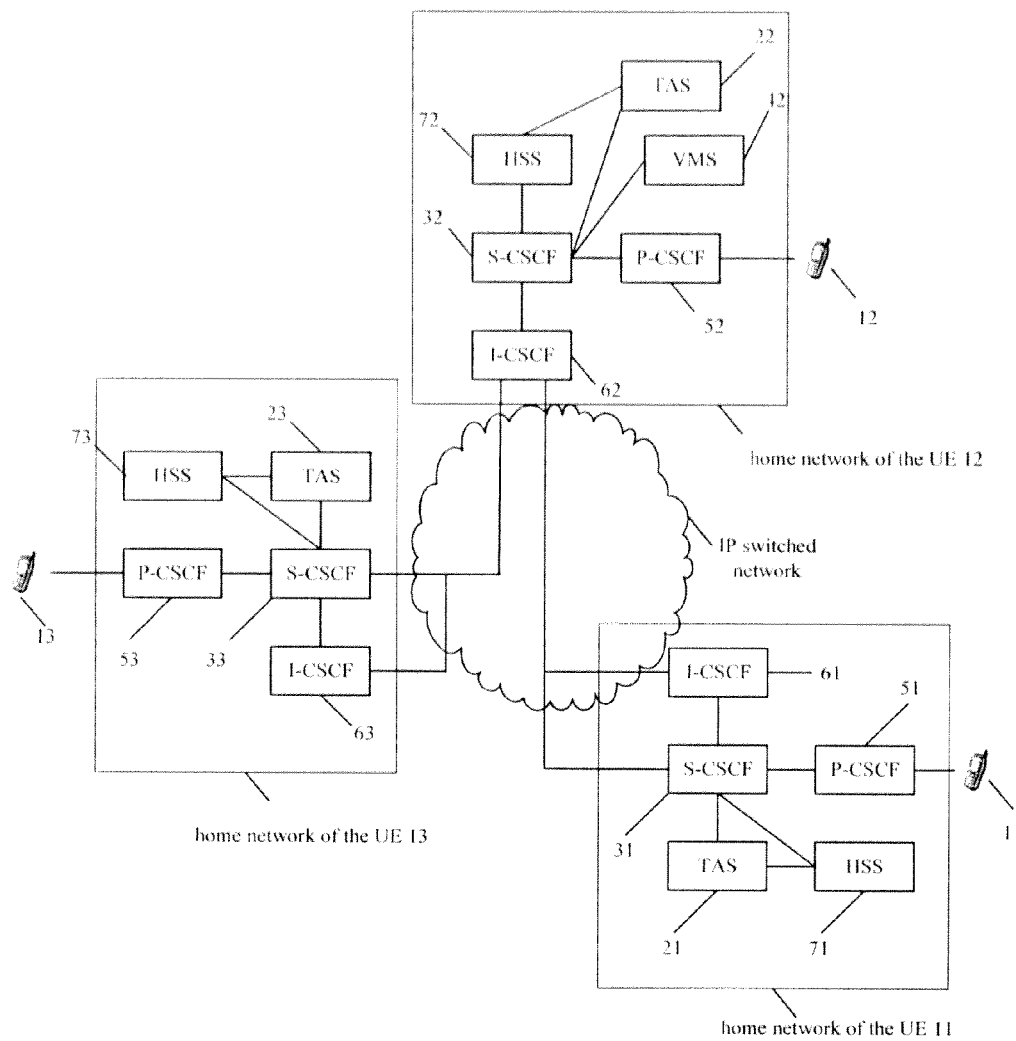
FIG. 1 shows a network topological diagram of an IP Multimedia Subsystem (IMS)-based system architecture according to an embodiment of the present invention.

FIG. 1 shows a network topological diagram of an IP Multimedia Subsystem (IMS)-based system architecture, which shows a second UE 12, a proxy-call session control function (P-CSCF) entity 52, an interrogating-call session control function (I-CSCF) entity 62, a serving-call session control function (S-CSCF) entity 32, a voice message server (VMS) 42, a telephony application server (TAS) 22, and a home subscriber server (HSS) 72 in home networks; a third UE 13, a P-CSCF entity 53, an I-CSCF entity 63, a S-CSCF entity 33, a VMS 43, a TAS 23 and a HSS 73 in home networks: a first UE 11, a P-CSCF entity 51, an I-CSCF entity 61, a S-CSCF entity 31, a VMS 41, a TAS 21 and a HSS 71 in home networks.

Figure 2A:
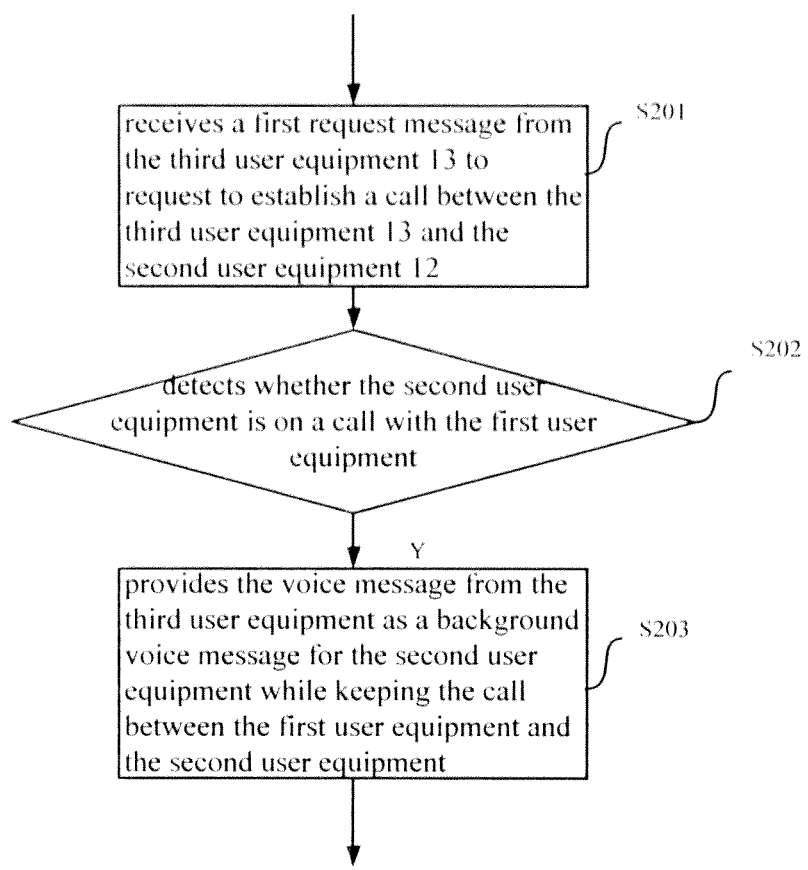
FIG. 2(a) shows a flow chart, in a call controlling device in telecommunication networks, of providing a second UE which is on a call with a first UE with a voice message from a third UE, according to an embodiment of the present invention.

FIG. 2(a) shows a flow chart, in a call controlling device in telecommunication networks, of providing a second UE which is on a call with a first UE with a voice message from a third UE, according to an embodiment of the present invention.

Taking it as an example that the second UE 12 and first UE 11 are on a call, and the third UE 13 calls the second UE 12 as shown in FIG. 1, the process of the call controlling device providing the second UE 12 with the voice message from the third UE 13 is described in detail. In this application scenario, the call controlling device can be the TAS 22 or the S-CSCF entity 32 in the home network of the second UE 12.

First, in step S201, the call controlling device receives a first request message from the third UE 13 requesting to establish a call with the second UE 12. The request message can be an INVITE message or an IAM (Initial Address Message), which will be taken as an example as follows.

Then, in step S202, the call controlling device detects whether the second UE 12 is on a call with the first UE 11. Since the second UE 12 is on a call with the first UE 11, the call controlling device detects that the second UE 12 is busy.

Here, it should be noted that the first UE 11 refers to any UE in general, instead of a specific UE.

Then, in step S203, if the second UE 12 is on a call with the first UE 11, the call controlling device provides the voice message from said third UE 13 as a background voice message for the second UE 12 while keeps the call between the first UE 11 and the second UE 12.

Figure 2B:
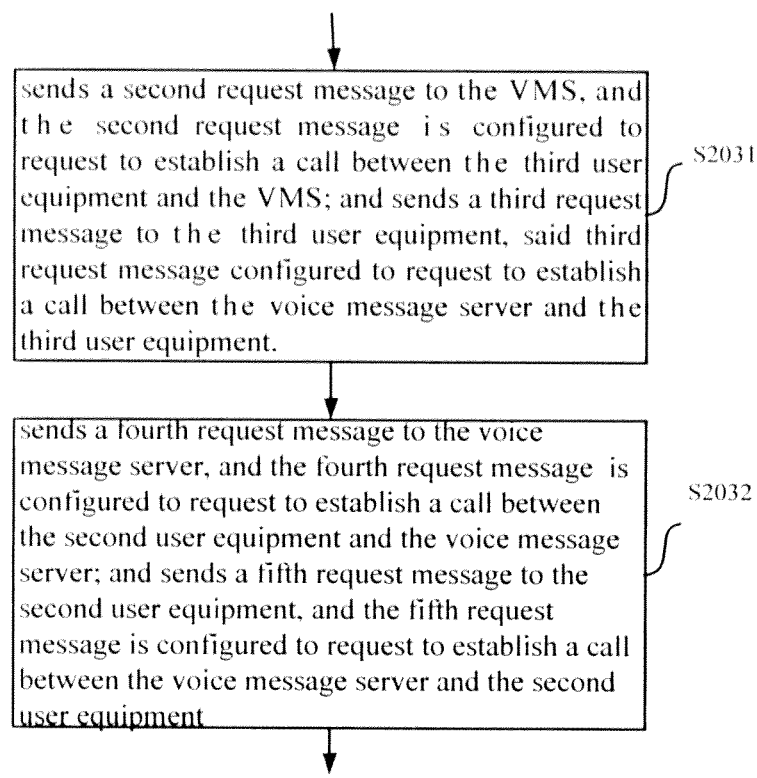
FIG. 2(b) shows a schematic flowchart of the substep S203 shown in FIG. 2(a)

In one embodiment, the step S203 can be implemented by the two substeps shown in FIG. 2(b). First, in step S2031, the call controlling device sends a second request message to the VMS 42, and the second request message is used to request to establish a call between the third UE 13 and the VMS 42; and sends a third request message to the third UE 13, and the third request message is used to request to establish a call between the VMS 42 and the third UE 13. The call between the VMS 42 and the third UE 13 is used by the third UE 13 to send the voice message destined to the second UE 12 to the VMS 42.

Then, in step S2032, the call controlling device sends a fourth request message to the VMS 42, the fourth request message is configured to request to establish a call between the second UE 12 and the VMS 42; and sends a fifth request message to the second UE 12, said fifth request message is configured to request to establish a call between the VMS 42 and the second UE 12. The call between the VMS 42 and the second UE 12 is used by the VMS 42 to send the voice message from the third UE 13 to the second UE 12.

It should be noted that, for the call controlling device, the step S2031 is optional. For example, in case that the call controlling device is the S-CSCF entity 32 in FIG. 1, the step S2031 can be implemented by other devices, for example, the TAS 22, therefore, the S-CSCF entity 32 does not need to implement step S2031.

Then, after step S2032, the call controlling device receives a response message from the third UE 13 responding to the third request message and a response message from the VMS 42 responding to the second request message. Of course, if the call controlling device does not need to implement step S2031, it will not receive the two response messages. The two response messages indicate that the voice channel between the third UE 13 and the VMS 42 can be established, then, the voice channel between the third UE 13 and the VMS 42 is established, and the third UE 13 sends the voice message to the VMS 42.

After step S2032, the call controlling device receives a response message from the second UE 12 and a response message from the VMS 42 respectively. The two response messages indicate that the voice channel between the second UE 12 and the VMS 42 can be established, then, the voice channel between the second UE 12 and the VMS 42 is established, and the VMS 42 sends the voice message from the third UE 13 to the second UE 12.

It should be noted that the step S2032 and the step S2031 can be implemented simultaneously. Alternatively, the step S2032 can be implemented after the call controlling device receives the response message from the third UE 13 that responds to the third request message and the response message from the VMS 42 that responds to the second request message.

Optionally, before step S203, the call controlling device can further determine whether the second UE 12 subscribes to a service for receiving the voice message from the third UE 13 when the second UE 12 is on the call with the first UE 11. If the second UE 12 subscribes to said service, step 203 and its subsequent steps are executed. For example, the second UE 12 can set that it can receive the voice message from other UEs unconditionally during a call. Optionally, the second UE 12 can preset some service strategies, for example, the second UE 12 can set in advance that it can receive the voice message from some specific UEs in the call during some specific periods; or the second UE 12 set whether to listen to the voice message or to leave a message according to the its own location and the calling party (i.e., the one that leave a message)'s location; or, the second UE 12 can set the priority of other users, when it is on a call with a UE with a higher priority, it will not receive the voice message from the UE with a lower priority; when it is on a call with a UE with a lower priority, it will receive the voice message from the UE with a higher priority.

Optionally, if the call controlling device needs to execute step S2031, then before step S2031, it can further determine whether the second UE 12 subscribes to the voice message service, if the second UE 12 subscribes to the voice message service, the step S2031, step S2032 and the subsequent steps are executed.

Figure 3:
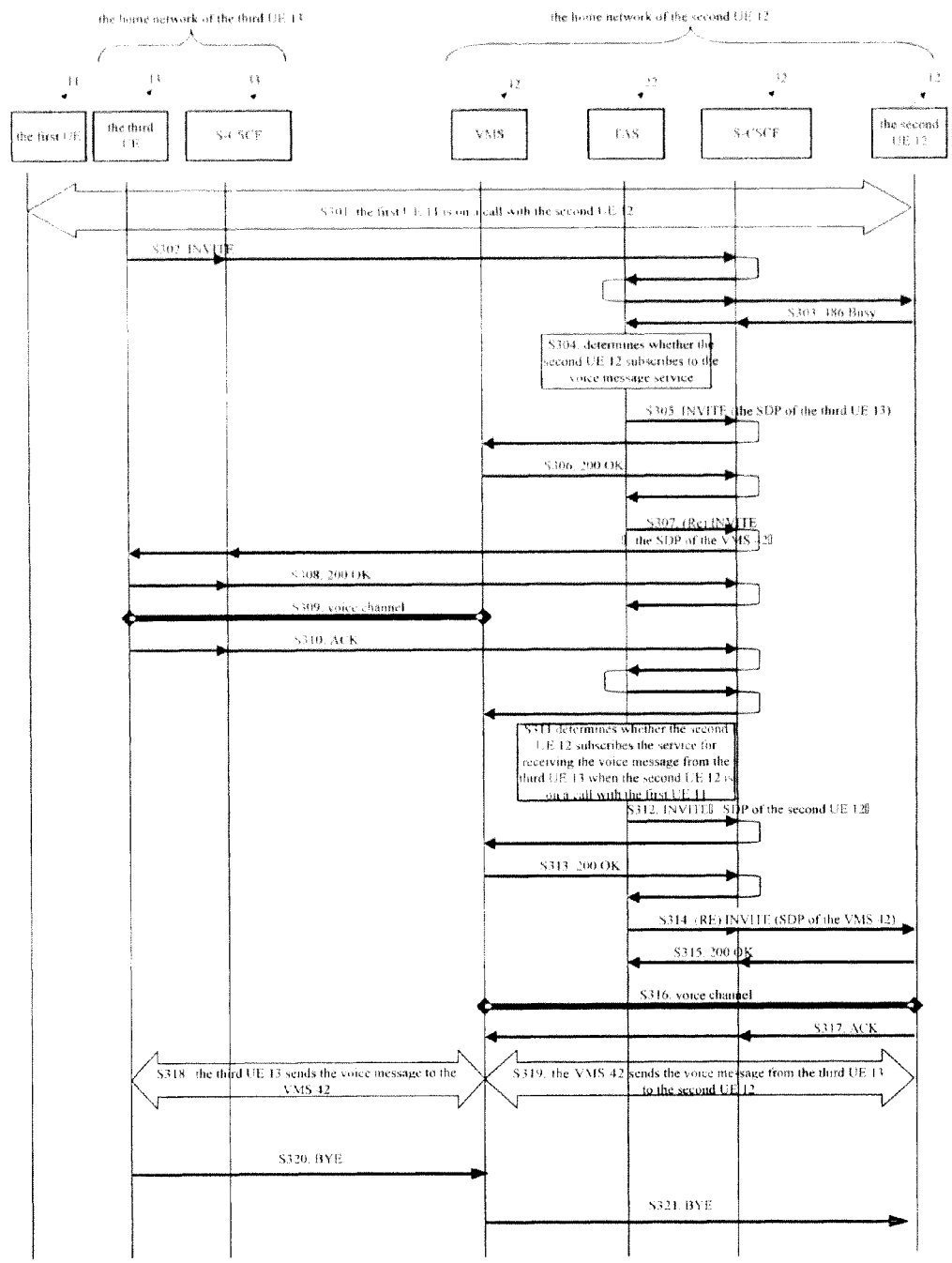
FIG. 3 shows a systematic signal flowchart, in a TAS 22 shown in FIG. 1, of providing a second US which is on a call with a first UE with a voice message from a third UE according to an embodiment of the present invention.

FIG. 3 shows a systematic signal flowchart, in a TAS 22 shown in FIG. 1, of implementing the function of the call controlling device shown in FIG. 2(a) based on SIP protocol. The systematic signal flowchart of FIG. 3 will be described in detail with reference to FIG. 1.

First, in step S301, the second UE 12 and the first UE 11 are in voice session. The voice session is established based on Real time Transport Protocol (RTP).

In step S302, the third UE 13 calls the second UE 12, the third UE 13 sends a first request message to request to establish a call with the second UE 12. that is, a first INVITE message, to the second UE 12. The first INVITE message includes the session description of the third UE 13 based on Session Description Protocol (SDP), which includes the session IP address of the third UE 13. the supported media format and type, the session ID, the session version, net type, and address type, and other parameters.

The first INVITE message is sent by the third UE 13, routed by the P-CSCF entity 53 and S-CSCF entity 33 in the home network of the third UE 13 and the backbone network, reaches I-CSCF entity 62 in the home network of the second UE 12, and is forwarded by the I-CSCF entity 62 to the S-CSCF entity 32. and the S-CSCF entity 32 sends the first INVITE message to the TAS 22. After the TAS 22 sends the first INVITE message to the S-CSCF entity 32, the S-CSCF entity 32 forwards it to the second UE 12 via the P-CSCF entity 52.

Since the second UE 12 is on the call with the first UE 11, therefore, after receiving the first INVITE message, the second UE 12 returns a busy message in step S303, and the busy message reaches the S-CSCF entity 32 via the P-CSCF entity 52, and the S-CSCF entity 32 sends the busy message to the TAS 22.

In step S304, the TAS 22 determines whether the second UE 12 subscribes to the voice message service. Usually the information that the second UE 12 subscribes to the voice message is stored in the HSS 72. The TAS 22 looks up the HSS 72 to determine whether the second UE 12 subscribes to the voice message. Optionally, the TAS 22 can pre-store the information about whether the second UE 12 subscribes to the voice message service.

If the second UE 12 subscribes to the voice message service, then, in step S305, the TAS 22 sends a second INVITE message to the VMS 42. The second INVITE message includes the session description of the third UE 13 based on SDP protocol, which includes the session IP address of the third UE 13, the supported media format and type, the session ID, the session version, network type, and address type, and other parameters.

Then, in step S306, the TAS 22 receives the 200 OK message from the VMS 42 which responds to the second INVITE message in step S305. The 200 OK message includes the session description of the VMS 42 based on SDP protocol, which includes the session IP address of the VMS 42, the supported media format and type, the session ID, the session version, network type, and address type, and other parameters.

Then, in step S307, the TAS 22 sends a third (Re) INVITE message to the third UE 13 via S-CSCF entity 32 to request to establish a call between the third UE 13 and the VMS 42. The (Re) INVITE message sets the called party as the VMS 42, and it includes the session description of the VMS 42 based on SDP protocol, which includes the session IP address of the VMS 42, the supported media format and type, the session ID, the session version, net type, and address type, and other parameters.

Then, in step S308, the TAS 22 receives the 200 OK message which responds to the third (Re) INVITE message from the third UE 13 forwarded by the S-CSCF entity 32.

In step S309, after the VMS 42 and the third UE 13 respectively receive session description of each other based on SDP, the voice channel between the two is established, and the third UE 13 can send the voice message that is to be left fir the second UE 12 to the VMS 42, which will be described in detail in the following step S318.

Then, in step S310, the third UE 13 sends an ACK message, and the ACK message reaches the VMS 42 via S-CSCF entity 32, TAS 22 and S-CSCF entity 32.

Then, in step S311, the TAS 22 determines whether the second UE 12 subscribes to the service for receiving the voice message from the third UE 13 when the second UE 12 is on a call with the first UE 11. Optionally, as discussed above, the TAS 22 can determine whether the second UE 12 receives the voice message from the third UE 13 when the second UE 12 is on the call with the first UE 11, based on a service strategy preset by the second UE 12.

If the second UE 12 subscribes to the service, the subsequent steps are executed.

In step S312, the TAS 22 sends a fourth INVITE message to the VMS 42 to request to establish a call between the second UE 12 and the VMS 42. The fourth INVITE message includes the session description of the second UE 12 based on SDP protocol, which includes the session IP address of the second UE 12, the supported media format and type, the session ID, the session version, network type, and address type, and other parameters.

Then, in step S313, the VMS 42 sends a 200 OK message which responds to the fourth INVITE message. The 200 OK message reaches the TAS 22 via the S-CSCF entity 32.

In step S314, the TAS 22 sends a fifth (Re)INVITE message to the second UE 12 to request to establish a call between the second UE 12 and the VMS 42. The fifth (Re)INVITE message includes the session description of the VMS 42 based on SDP protocol, which includes the session IP address of the VMS 42, the supported media format and type, the session ID, the session version, network type, and address type, and other parameters.

Then, in step S315, the second UE 12 sends a 200 OK message which responds to the fifth INVITE message.

In step S316, after the VMS 42 and the second UE 12 respectively receive session description of each other based on SDP, the voice channel between the two is established, and the VMS 42 can send the voice message from the third UE 13 to the second UE 12.

Then, in step S317 the second UE 12 sends an ACK message, and the ACK message reaches the VMS 42 via S-CSCF entity 32.

In step S318, the third UE 13 sends the voice message to the VMS 42. In step S319, the VMS 42 sends the voice message from the third UE 13 to the second UE 12. Usually, the establishment of the voice channel between the UE 13 and the VMS 42 is earlier than the establishment of the voice channel between the UE 12 and the VMS 42. Therefore, the VMS 42 may need to register the voice message from the third UE 13.

Optionally, the volume for the second UE 12 to play the voice message can be set by the VMS 42. The second UE 12 can set in advance the volume for the second UE 12 to play the voice message from different UEs. Usually, in order to bring interference as small as possible to the call between the second UE 12 and the first UE 11, the VMS 42 can set the voice message to be played at a lower volume in the second UE 12. Of course, the voice message from a specific UE can be set to be played at a higher volume according to the preset of the second UE 12.

In step S320, the third UE 13 sends a BYE message to terminate the call with the VMS 42, that is, finish sending the voice message. In step S321, the VMS 42 sends a BYE message to terminate the call with the second UE 12, that is, finish sending the voice message.

It should be noted that, the flowchart shown in FIG. 3 is only illustrative. In different embodiments, the executing order for each step may differ from that shown in the flowchart of FIG. 3. For example, the order of step S305 and step S307 does not matter, that is the step S307 and the step S305 can be executed simultaneously, or the step S307 can be executed prior to the step S305. Similarly, the order of step S312 and step S314 does not matter.

Besides, the step S304 and step S311 are optional. In some embodiment, it is not necessary to determine whether the second UE 12 subscribes to the voice message service or whether the second UE 12 subscribes to the service to listen to the voice message during a call. The 200 OK messages and ACK messages shown in FIG. 3 are all optional.

It should also be noted that, for the establishment of a call in FIG. 3, only one INVITE message is illustrated for determining the establishment of the voice channel. If the session parameters between the two communicating parties are not consistent, more rounds of the INVITE messages for consultation are needed, the details of which can refer to the IETF RFC 3261 and RFC 4566 and are not repeated here.

The TAS 22 is taken as an example above to describe in detail the process for it to provide the voice message from the third UE 13 to the second UE 12 which is on a call with a first UE 11. The S-CSCF entity 32 will be taken as an example in the follows to describe in detail the process for it to provide the voice message from the third UE 13 to the second UE 12 which is on a call with a first UE 11.

Figure 4:
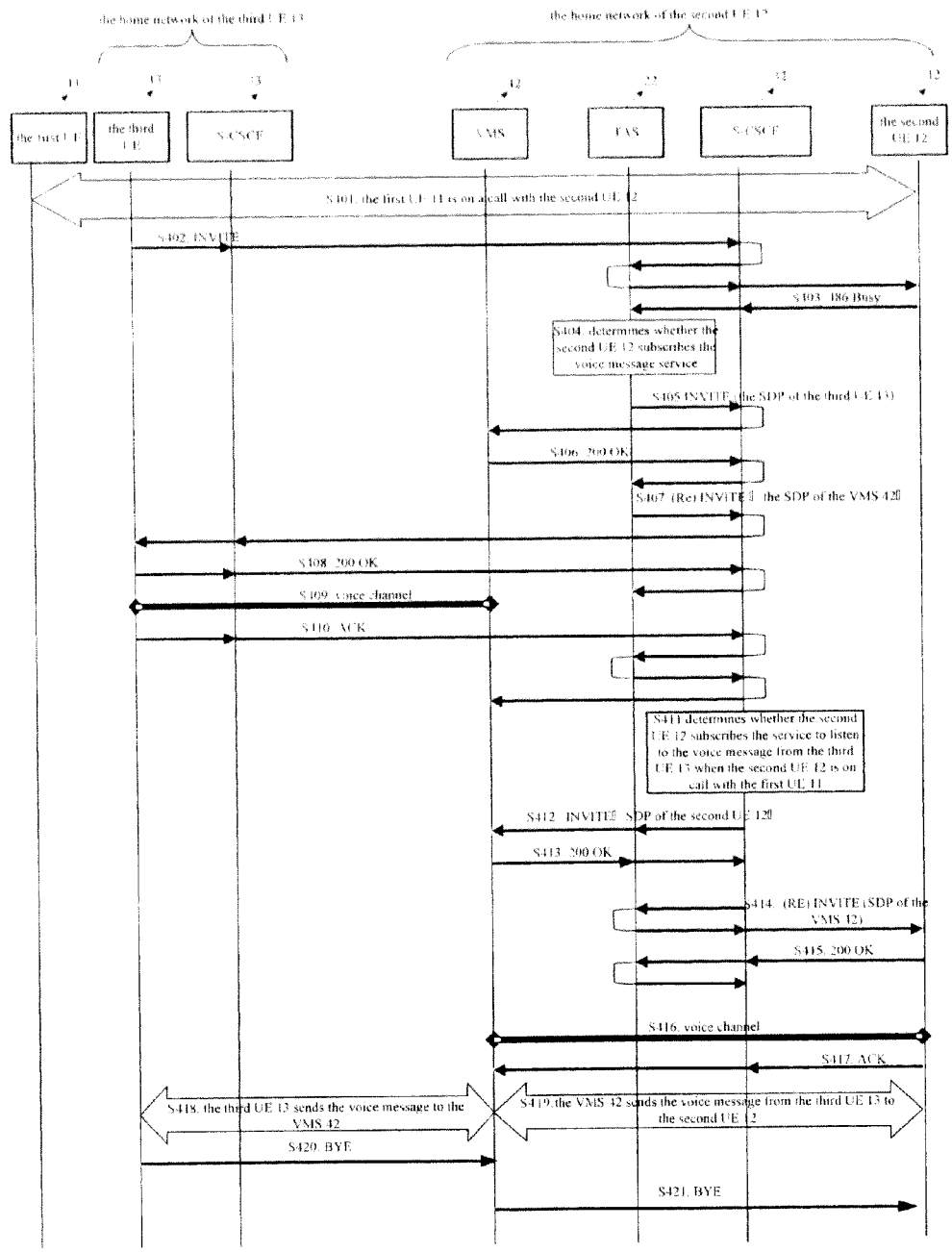
FIG. 4 shows a systematic signal flowchart of a method, in a serving-call session control function (S-CSCF) entity 32 shown in FIG. 1, of providing a second UE which is on a call with a first UE with a background voice message from a third UE according to another embodiment of the present invention.

FIG. 4 shows a signal flowchart, in an S-CSCF entity 32, of providing a second UE 12 which is on a call with a first UE 11 with a voice message from a third UE 13.

The steps S401 to S410 prior to the step S411 correspond to the steps S301 to S310 in FIG. 3 in a one-to-one manner, and are not repeated here.

In step S411, the S-CSCF entity 32 determines whether the second UE 12 subscribes to the service to listen to the voice message from the third UE 13 when the second UE 12 is on a call with the first UE 11.

If the second UE 12 subscribes to the service, the subsequent steps are executed.

In step S412, the S-CSCF entity 32 sends a fourth INVITE message to the VMS 42 to request to establish a call between the second UE 12 and the VMS 42. The fourth INVITE message includes the session description of the second UE 12 based on SDP protocol, which includes the session IP address of the second UE 12, the supported media format and type, the session ID, the session version, net type, and address type, and other parameters.

Then, in step S413, the VMS 42 sends a 200 OK message which responds to the fourth INVITE message forwarded by the TAS 22 to the S-CSCF entity 32.

Then, in step S414, the S-CSCF entity 32 sends a fifth (Re) INVITE message to the second UE 12 to request to establish a call between the second UE 12 and the VMS 42. The fifth (Re)INVITE message includes the session description of the VMS 42 based on SDP protocol, which includes the session IP address of the VMS 42, the supported media format and type, the session ID, the session version, network type, and address type, and other parameters.

Then, in step S415, the second UE 12 sends a 200 OK message which responds to the fifth INVITE message to the S-CSCF entity 32.

In step S416, after the VMS 42 and the second UE 12 respectively receive session description of each other based on SDP, the voice channel between the two is established, and the VMS 42 can send the voice message from the third UE 13 to the second UE 12.

Then, in step S417, the second UE 12 sends an ACK message, and the ACK message reaches the VMS 42 via the S-CSCF entity 32.

In step S418, the third UE 13 sends a voice message to the VMS 42. In step S419, the VMS 42 sends the voice message from the third UE 13 to the second UE 12.

In step S420, the third UE 13 sends a BYE message to terminate the call with the VMS 42, that is, finish sending the voice message. In step S421, the VMS 42 sends a BYE message to terminate the call with the second UE 12, that is, finish sending the voice message.

Figure 5:
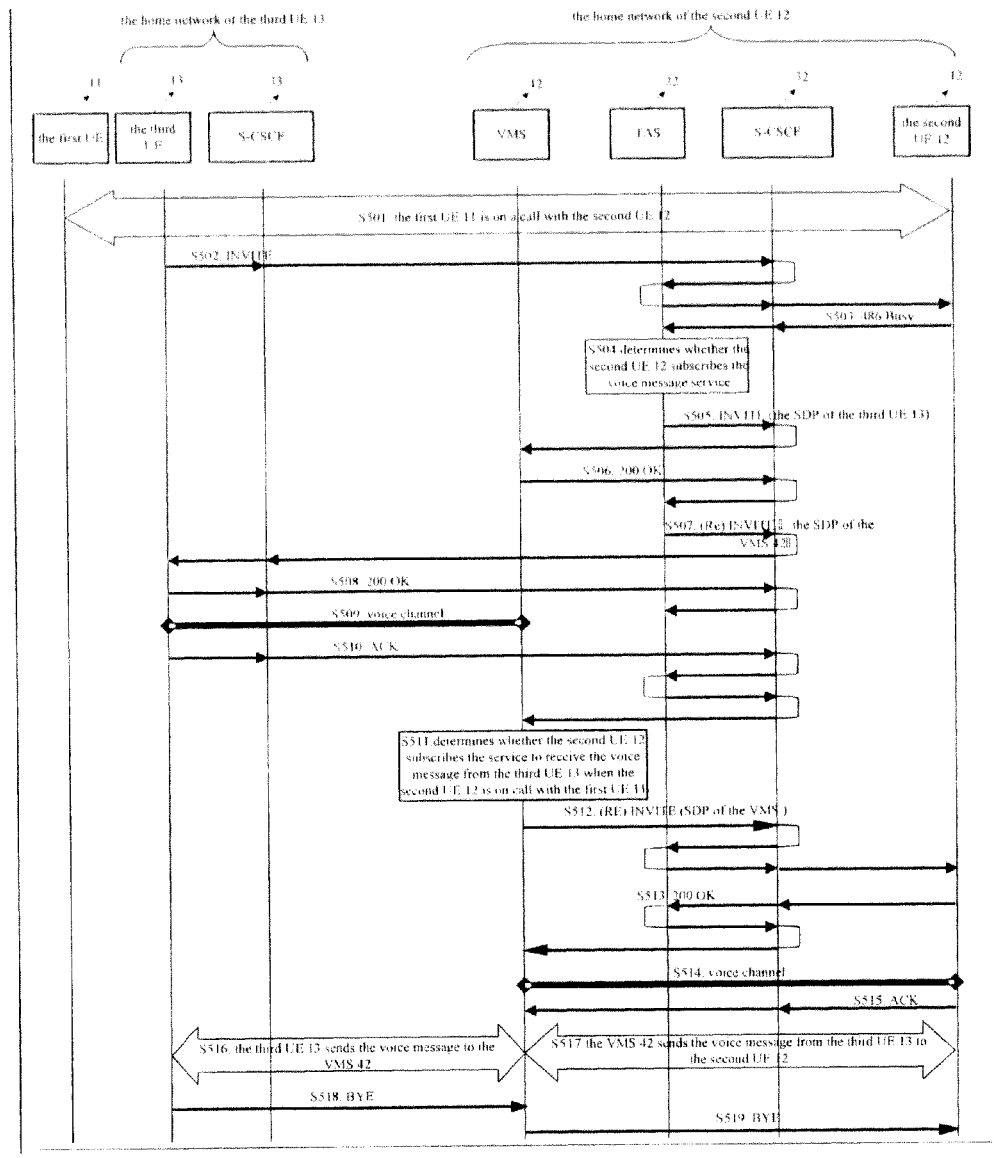
FIG. 5 shows a systematic signal flowchart of a method, in a VMS 42 shown in FIG. 1, of providing a second UE which is on a call with a first UE with a voice message from a third UE according to an embodiment of the present invention.

In an embodiment, the function realized by the signal flowchart shown in step S311 to step S315 or step S411 to step S415 also can be accomplished by the VMS 42. FIG. 5 shows a signal flowchart, in the VMS 42, of providing a second UE 12 which is on a call with a first UE 11 with a voice message from a third UE 13.

The steps S501 to S510 correspond to the steps S301 to S310 in FIG. 3 in a one-to-one manner, and are not repeated here.

In step S511, the VMS 42 determines whether the second UE 12 subscribes to the service to listen to the voice message from the third UE 13 when the second UE 12 is on a call with other UEs.

If the second UE 12 subscribes to the service, the subsequent steps are executed.

In step S512, the VMS 42 sends a sixth (Re) INVITE message to the second UE 12 to request to establish a call between the second UE 12 and the VMS 42. The sixth (Re) INVITE message includes the session description of the VMS 42 based on SDP protocol, which includes the session IP address of the VMS 42, the supported media format and type, the session ID, the session version, network type, and address type, and other parameters.

Then, in step S513, the second UE 12 sends a 200 OK message which responds to the sixth (Re) INVITE message to the VMS 42. The 200 OK message includes the session description of the second UE 12 based on SDP protocol, which includes the session IP address of the second UE 12, the supported media format and type, the session ID, the session version, network type, and address type, and other parameters.

In step S514, after the VMS 42 and the second UE 12 respectively receive session description of each other based on SDP, the voice channel between the two is established, and the VMS 42 can send the voice message from the third UE 13 to the second UE 12.

Then, in step S515, the second UE 12 sends an ACK message, and the ACK message reaches the VMS 42 via the S-CSCF entity 32.

In step S516, the third UE 13 sends the voice message to the VMS 42. In step S517, the VMS 42 sends the voice message from the third UE 13 to the second UE 12.

In step S518, the third UE 13 sends a BYE message to terminate the call with the VMS 42, that is, finish sending the voice message. In step S519, the VMS 42 sends a BYE message to terminate the call with the second UE 12, that is, finish sending the voice message.

The network topology of the IMS architecture shown in FIG. 1 is taken as an example to elucidate the process for the call controlling device or the VMS 42 of providing a voice message from the third UE 13 to the second UE 12 while keeping the call between the first UE 11 and the second UE 12. It should be noted that the flow charts shown in FIG. 3 to FIG. 5 are illustrative, for different network topologies, the specific implementing steps are different, and those skilled in the art can introduce the technical solution of the present invention to other network topologies based on the shown flowcharts. Besides, the TAS 22, the S-CSCF entity 32 and the VMS 42 are divided in terms of their functionality, in practical implementation, one or more above functional entities can be integrated into one hardware device for implementation, meanwhile, some of the interactive steps among the functional entities can be omitted car he implemented with internal control protocol.

Figure 6:
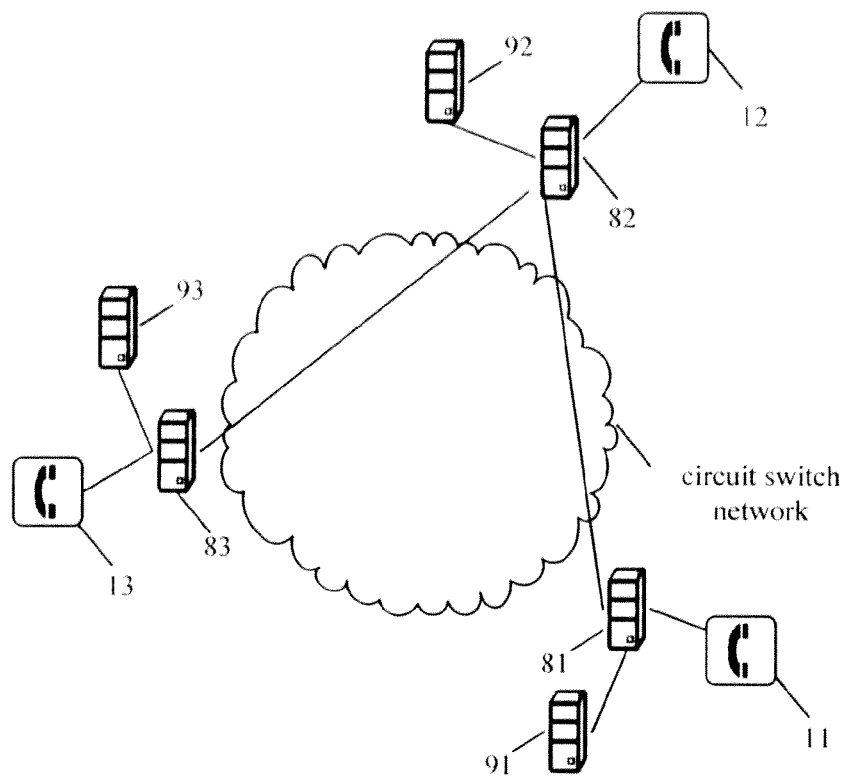
FIG. 6 shows a topological diagram of a circuit-switched based telecommunication network according to an embodiment of the present invention.

The circuit-switched based fixed telecommunication network shown in FIG. 6 is taken as an example, to elucidate the process for the VMS of providing a second UE 12 which is on a call with a first UE 11 with a voice message from a third UE 13.

FIG. 6 shows a topological diagram of a circuit-switched based telecommunication network. In FIG. 6, the second UE 12 and the switch 82 and the VMS 92 in its home network, the third UE 13 and the switch 83 in its home network, and the first UE 11 and the switch 81 in its home network are shown. Those skilled in the art can understand, the topology in FIG. 6 is only illustrative, the home network of each UE can also include other devices, such as access devices, the home network of the third UE 13 may also include a VMS, since they are not directly related to the object of the present invention, they are not listed one by one.

Figure 7:
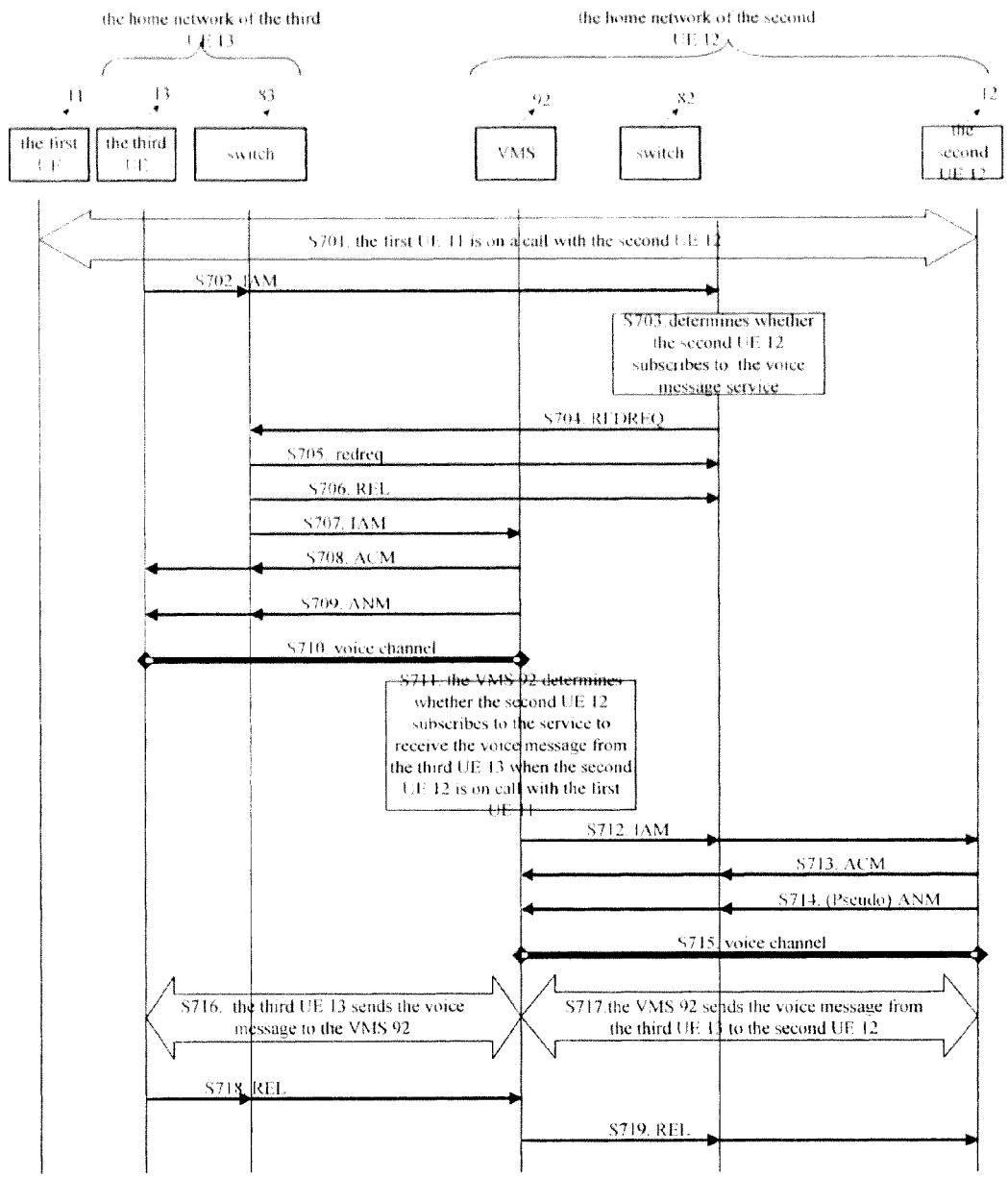
FIG. 7 shows a No. 7 signal flowchart, in a VMS 92 shown in FIG. 6, of providing a second UE which is on a call with a first UE with a background voice message from a third UE according to another embodiment of the present invention.

FIG. 7 shows a No. 7 signal flowchart, in a VMS 92, of providing a second UE 12 which is on a call with a first UE 11 with a voice message from a third UE 13. The signal flowchart shown in FIG. 7 will be described in detail with reference to FIG. 6.

First, in step S701, the voice session between the second UE 12 and the first UE 11 is being carried out. The voice session is established on the ISDN User Part (ISUP) standard.

Then, in step S702, the third UE 13 calls the second UE 12. The third UE 13 sends an IAM message to the second UE 12 requesting to establish a call with the second UE 12, and the IAM message includes the number of the second UE 12.

The IAM message is sent out by the third UE 13, routed through the circuit-switched network via the switch 83 in the home network of the third UE 13, and reaches the switch 82 in the home network of the second UE 12.

Since the second UE 12 is on a call with the first UE 11, therefore, after receiving the IAM message, in step S703, the switch 82 detects that the second UE 12 is on a call, then, it determines whether the second UE 12 subscribes to a voice message service.

If the second UE 12 subscribes to the voice message service, then, in step S704, the switch 82 sends a REDREQ (Redirection Request) message to the switch 83, to inform the switch 83 that the second UE 12 is busy, and the IAM message is redirected to the VMS 92.

In step S705, the switch 83 sends a redreq message (the response message to the REDREQ message) to the switch 82.

In step S706, the switch 83 sends a REL (Release) message to the switch 82.

In step S707, the switch 83 sends an IAM message to the VMS 92, and the IAM message is used to request to establish a call between the third UE 13 and the VMS 92.

In step S708, the VMS 92 sends an ACM (Address Complete Message) to the third UE 13 via the switch 83.

In step S709, the VMS 92 sends an ANM (Answer Message) to the third UE 13 via the switch 83.

Subsequently, in step S710, the voice channel between the VMS 92 and the third UE 13 is established, and the third UE 13 can send the voice message to be left for the second UE 12 to the VMS 92.

Then, in step S711, the VMS 92 determines whether the second UE 12 subscribes to the service for receiving the voice message from the third UE 13 when the second UE 12 is on a call with the first UE 11.

If the second UE 12 subscribes to the service, the subsequent steps are executed.

Then, in step S712, the VMS 92 sends an IAM message to the second UE 12 requesting to establish a call with the second UE 12.

Then, in step S713, the second UE 12 sends an ACM message to the VMS 92.

In step S714, the second UE 12 sends a (Pseudo) ANM message to the VMS 92.

In step S715, the voice channel between the VMS 92 and the second UE 12 is established, and the VMS 92 can send the voice message from the third UE 13 to the second UE 12.

Then, in step S716, the third UE 13 sends the voice message to the VMS 92. In step S717, the VMS 92 sends the voice message from the third UE 13 to the second UE 12.

In step S718, the third UE 13 sends a REL message to terminate the call with the VMS 92, that is, finish sending the voice message. In step S719, the VMS 92 sends a REL message to terminate the call with the second UE 12, that is, finish sending the voice message.

The process, in the VMS 92 in a circuit-switched based telecommunication network, of providing the second UE 12 which is on a call with the first UE 11 with a voice message from the third UE 13 is described in detail with the signal flowchart shown in FIG. 7. It should be noted that, the signal flowchart shown in FIG. 7 is only illustrative, there are many modifications based on this. For example, the step S711 is optional, the VMS 92 can execute step S712 after receiving the IAM message in step S707 without determining. The execution order of step S708 and step S711 (or step S712) doesn't matter. Besides, if the second UE 12 and the third UE 13 do not support No. 7 signaling, then the transporting of other signals can be implemented between the second UE 12 and the switch 82, as well as the third UE 13 and the switch 83.

Figure 8:
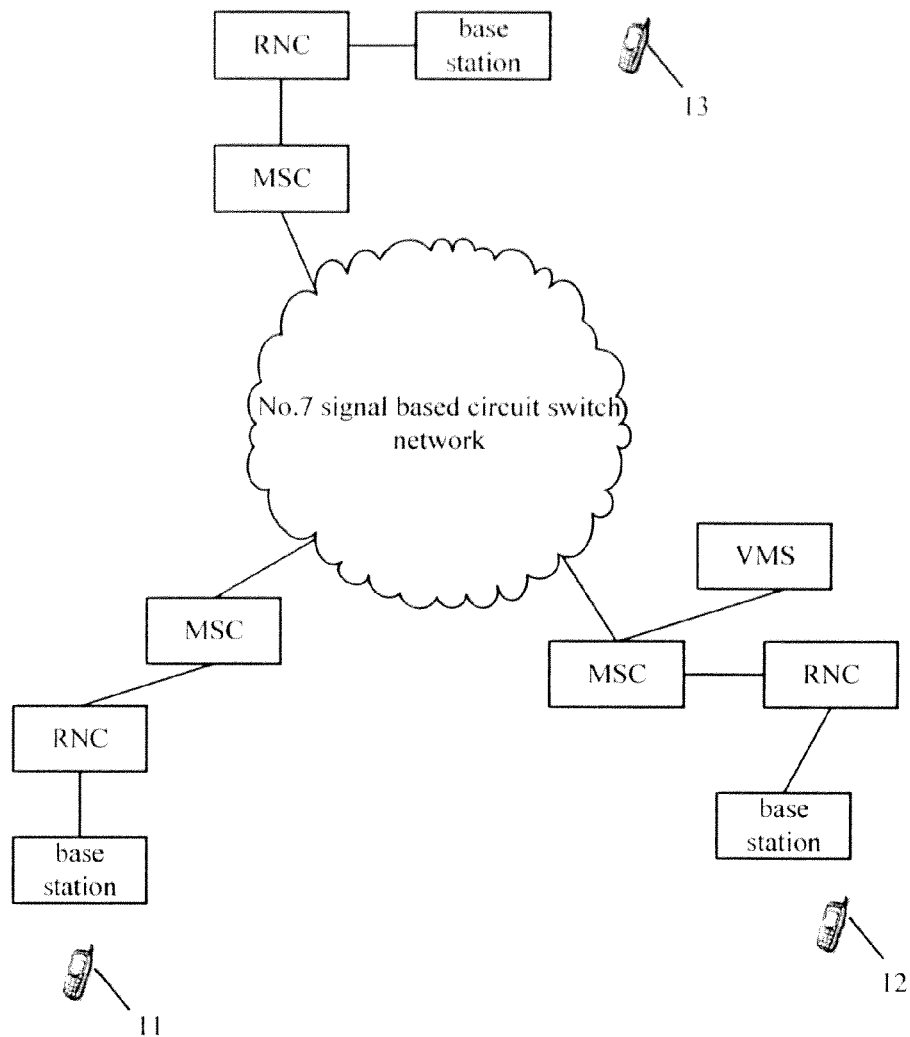
FIG. 8 shows a topological diagram of a circuit-switched based wireless telecommunication network.

For the circuit-switched based wireless telecommunication network shown in FIG. 8, the mobile switch center (MSC) corresponding to the UE can be implemented to realize the function of the VMS 92 in FIG. 7, referring to the flowchart shown in FIG. 7.

The process when the second UE 12 is located in its home network and is on a call with the first UE 11, the call controlling device or the VMS provides it with the voice message from the third UE 13 is described in detail. For the case when the second UE 12 is roaming, the process for the call controlling device in the roaming area to provide the voice message from the third UE 13 is similar to that above, and is not repeated here.

Figure 9:
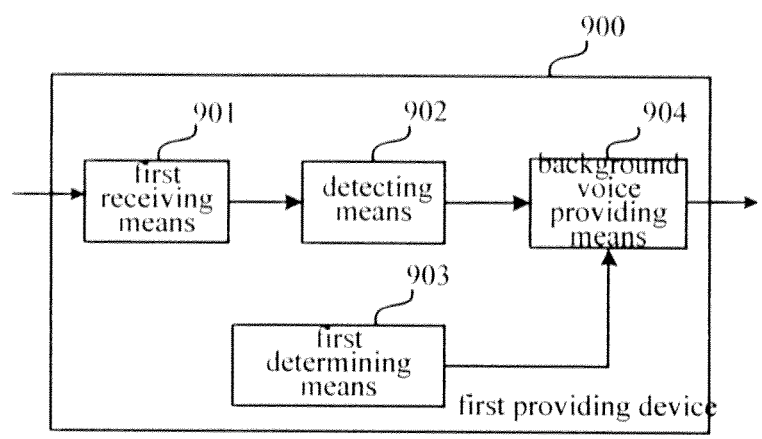
FIG. 9 shows a block diagram of a first providing device 900 in a call controlling device in telecommunication networks, for providing a second UE which is on a call with a first UE with a voice message from a third UE, according to an embodiment of the present invention.

FIG. 9 shows a block diagram of a first providing device 900 in a call controlling device in telecommunication networks, for providing a second UE which is on a call with a first UE with a voice message from a third UE, according to an embodiment of the present invention. In FIG. 9, the first providing device 900 includes a first receiving means 901, a detecting means 902, a first determining means 903 and a background voice providing means 904.

Without loss of generality, the network topology shown in FIG. 1 and the case that the second UE 12 and the first UE 11 are on a call, and the third UE 13 calls the second UE 12 is taken as an example to describe in detail the process of the first providing device 900 in the call controlling device for providing the second UE 12 with a voice message from the third UE 13. In the application scenario, the call controlling device can be the TAS 22 or the S-CSCF entity 32 in the home network of the second UE 12 in FIG. 1.

First, the first receiving means 901 receives a first request message from the third UE 13. The first request message is used to request to establish a call between the third UE 13 and the second UE 12.

Then, the detecting means 902 detects whether the second UE 12 is on a call with the first UE 11. Since the second UE 12 is on a call with the first UE 11, the detecting means 902 detects that the second UE 12 is busy.

Then, if the second UE 12 is on a call with the first UE 11, the background voice providing means 904 provides the voice message from the third UE 13 as a background voice message for the second UE 12 while keeps the call between the first UE 11 and the second UE 12.

In one embodiment, the background voice providing means 904 sends a second request message to the VMS 42, and the second request message is used to request to establish a call between the third UE 13 and the VMS 42; and sends a third request message to the third UE 13, and the third request message is used to request to establish a call between the VMS 42 and the third UE 13. This operation is optional, for when the call controlling device is the S-CSCE entity 32 shown in FIG. 1, the operation an be realized by other devices, such as the TAS 22, and the S-CSCF entity does not need to execute the operation.

At last, the background voice providing means 904 sends a fourth request message to the VMS 42 requesting to establish a call between the second UE 12 and the VMS 42; and sends a fifth request message to the second UE 12 requesting to establish a call between the VMS 42 and the second UE 12.

Then, the first receiving means 901 receives a response message from the third UE 13 for responding to the third request message and a response message from the VMS 42 for responding to the second request message. The two response messages indicate that the voice channel between the third UE 13 and the VMS 42 can be established, then, the voice channel between the third UE 13 and the VMS 42 is established, and the third UE 13 sends the voice message to the VMS 42.

The first receiving means 901 receives a response from the second UE 12 for responding to the fifth request message and a response message from the VMS 42 for responding to the fourth request message respectively. The two response messages indicate that the voice channel between the second UE 12 and the VMS can be established, then, the voice channel between the second UE 12 and the VMS 42 is established, and the VMS 42 sends the voice message from the third UE 13 to the second UE 12.

Optionally, before the background voice providing means 904 sends the fourth and the fifth request messages, the first determining means 903 can further determine whether the second UE 12 subscribes to a service for receiving the voice message from the third UE 13 when the second UE 12 is on the call with the first UE 11. If the second UE 12 subscribes to the service, the background voice providing means 904 executes its sending operation. The second UE 12 can set that it can receive the voice message from other UEs unconditionally during a call. Optionally, the second UE 12 can set in advance some service strategies, for example, the second UE 12 can set that it can receive the voice message from some specific UEs in the call during some specific periods; or the second UE 12 set whether to listen to the voice message or to leave a message according to its own location and the calling party(i.e., the one that leave a message)'s location; or, the second UE 12 can set the priority of other users, when it is on a call with a UE with a higher priority, it will not receive the voice message from the UE with a lower priority; when it is on a call with a UE with a lower priority, it will receive the voice message from the UE with a higher priority.

Optionally, if the background voice providing means 904 needs to send the second request message and the third request message, then the determining means 903 can further determine whether the second UE 12 subscribes to the voice message service, if the second UE 12 subscribes to the voice message service, the background voice providing means 904 executes the subsequent operations.

Figure 10:
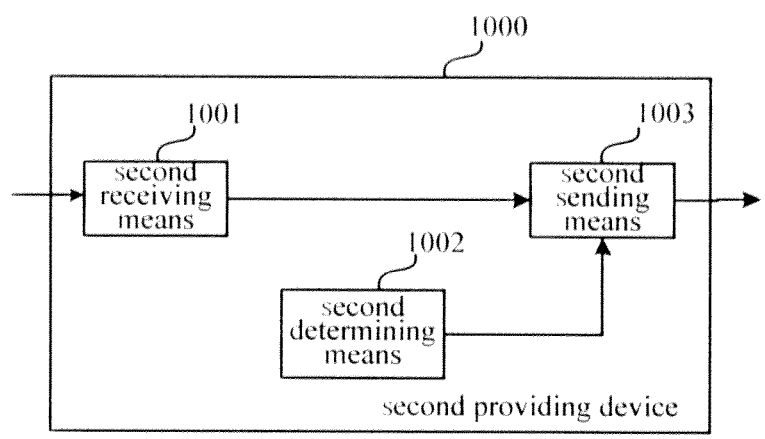
FIG. 10 shows a block diagram of a second providing device 1000 in a VMS in telecommunication networks, for providing a second UE which is on a call with a first UE with a voice message from a third UE, according to an embodiment of the present invention; wherein, same or similar reference numerals refer to the same or similar steps or means.

FIG. 10 shows a block diagram of a second providing device 1000, in a VMS in telecommunication networks, for providing a second UE which is on a call with a first UE with a voice message from a third UE, according to an embodiment of the present invention. In FIG. 10, the second providing device 1000 includes a second receiving means 1001, a second determining means 1002 and a second sending means 1003.

Without loss of generality, the network topology shown in FIG. 1 or FIG. 6 and the case that the second UE 12 and the first UE 11 are on a call, and the third UE 13 calls the second UE 12 is taken as an example to describe in detail the process of the second providing device 1000 in the VMS 42 or 92 for providing the second UE 12 with a voice message from the third UE 13.

First, the second receiving means 1001 receives a third request message from the call controlling device. The third request message is used to request to establish a call between the third UE 13 and the VMS. For the network topology shown in FIG. 1, the third request message is the INVITE message shown in step S505 in FIG. 5, and the call controlling device is the TAS 22 or the S-CSCF entity 32. For the network topology shown in FIG. 6, the third request message is the IAM message shown in step S707 in FIG. 7, and the call controlling device is the switch 83. Then, the second sending means 1003 sends a sixth request message to the second UE 12, requesting to establish a call between the second UE 12 and the VMS. For the network topology IS shown in FIG. 1, the sixth request message is the INVITE message shown in step S512 of FIG. 5. For the network topology shown in FIG. 6, the sixth request message is the IAM message shown in step S712 of FIG. 7.

Then, the second receiving means 1001 receives a response message from the second UE 12. For the network topology shown in FIG. 1, the response message is the 200 OK message shown in step S513 of FIG. 5. For the network topology shown in FIG. 6, the response message is the ACM and (Pseudo) ANM messages shown in step S713 and S714 of FIG. 7.

Optionally, before the second sending means 1003 sends the sixth request message, the second determining means 1002 can determine whether the second UE 12 subscribes to a service for receiving the voice message from the third UE 13 when the second UE 12 is on the call with the first UE 11. If the second UE 12 subscribes to the service, the second sending means 1003 then executes its sending operation.

It should be noted that those skilled in the art can understand that the formats of the first to the sixth request messages and each response message are not limited to what are shown in FIG. 3 to FIG. 5 or FIG. 7, and their formats can vary with the change of the adopted telecommunication protocol.

Those skilled in the art can understand that the above-described embodiments are for purpose of illustration only, and not construed as limitation of the invention. The present invention is not limited to these embodiments. All technical solutions which do not depart from the spirit of the invention are intended to be included within the scope of the appended claims. Besides, in the claims, any reference signs placed between parentheses shall not be construed as limiting the claim. The word "comprising" does not exclude the presence of elements or steps not listed in the claim or in the description. The word "a" or "an" preceding an element does not exclude the presence of a plurality of such elements. In device that includes a plurality of means, one or more functions of the plurality of means can be implemented by one hardware or software module; the words "first", "second" and "third" only represent name, and do not mean specific order.

What is claimed is:

1. A method, in a call controlling device in telecommunication networks, for providing a second user equipment which is on a call with a first user equipment with a voice message from a third user equipment, comprising:
   receiving a first request message from the third user equipment, the first request message configured to request to establish a call between the third user equipment and the second user equipment;
   detecting whether the second user equipment is on a call with the first user equipment; and
   if the second user equipment is on a call with the first user equipment, providing the voice message from the third user equipment as a background voice message for the second user equipment while the call between the first user equipment and the second user equipment is not affected.

2. A method according to claim 1, wherein providing the voice message from the third user equipment as a background voice message for the second user equipment while the call between the first user equipment and the second user equipment is not affected comprises:
   if the second user equipment is on a call with the first user equipment, sending a fourth request message to a voice message server, the fourth request message configured to request to establish a call between the second user equipment and the voice message server; and sending a fifth request message to the second user equipment, the fifth request message configured to request to establish a call between the voice message server and the second user equipment.

3. A method according to claim 2, further comprising, before sending a fourth request message to a voice message server, the fourth request message configured to request to establish a call between the second user equipment and the voice message server; and sending a fifth request message to the second user equipment, the fifth request message configured to request to establish a call between the voice message server and the second user equipment:
   if the second user equipment is on a call with the first user equipment, sending a second request message to the voice message server, the second request message configured to request to establish a call between the third user equipment and the voice message server; and sending a third request message to the third user equipment, the third request message configured to request to establish a call between the voice message server and the third user equipment.

4. A method according to claim 1, further comprising, before providinq the voice message from the third user equipment as a background voice message for the second user equipment while the call between the first user equipment and the second user equipment is not affected:
   determining whether the second user equipment subscribes to a service for receiving the voice message from the third user equipment when the second user equipment is in a call with the first user equipment; and
   if the second user equipment subscribes to the service, providing the voice message from the third user equipment as a background voice message for the second user equipment while the call between the first user equipment and the second user equipment is not affected.

5. A method according to claim 4, wherein determining whether the second user equipment subscribes to a service for receiving the voice message from the third user equipment when the second user equipment is in a call with the first user equipment comprises:
   determining whether the second user equipment receives the voice message from the third user equipment when the second user equipment is on the call with the first user equipment, based on a service strategy preset by the second user equipment.

6. A method according to claim 3, further comprising:
   receiving a response message from the voice message server for responding to the fourth request message;
   receiving a response message from the second user equipment for responding to the fifth request message;
   receiving a response message from the third user equipment for responding to the third request message; and
   receiving a response message from the voice message server for responding to the second request message.

7. A method, in a voice message server in telecommunication networks, for providing a second user equipment which is on a call with a first user equipment with a background voice message from a third user equipment, comprising:
   receiving a request message from a call controlling device, the request message configured to request to establish a call between the voice message server and the third user equipment; and
   sending another request message to the second user equipment, the other request message configured to request to establish a call between the voice message server and the second user equipment.

8. A method according to claim 7, further comprising, before sending another request message to the second user equipment, the other request message configured to request to establish a call between the voice message server and the second user equipment:
   determining whether the second user equipment subscribes to a service for receiving the voice message from the third user equipment when the second user equipment is on the call with the first user equipment; and if the second user equipment subscribes to the service, sending another request message to the second user equipment, the other request message configured to request to establish a call between the voice message server and the second user equipment.

9. A method according to claim 8, wherein determining whether the second user equipment subscribes to a service for receiving the voice message from the third user equipment when the second user equipment is on the call with the first user equipment comprises:

determining whether the second user equipment receives the voice message from the third user equipment when the second user equipment is on the call with the first user equipment, based on a service strategy preset by the second user equipment.

10. A first providing device in a call controlling device in telecommunication networks, for providing a second user equipment which is on a call with a first user equipment with a voice message from a third user equipment, comprising:

a first receiving device configured to receive a first request message from the third user equipment, the first request message configured to request to establish a call between the third user equipment and the second user equipment;

a detecting device configured to detect whether the second user equipment is on a call with the first user equipment; and a background voice providing device configured to provide the voice message from the third user equipment as a background voice message for the second user equipment while the call between the first user equipment and the second user equipment is not affected, if the second user equipment is on a call with the first user equipment.

11. A first providing device according to claim 10, wherein the background voice providing device is configured to:

send a fourth request message to a voice message server, the fourth request message configured to request to establish a call between the second user equipment and the voice message server; and send a fifth request message to the second user equipment, the fifth request message configured to request to establish a call between the voice message server and the second user equipment, if the second user equipment is on the call with the first user equipment.

12. A first providing device according to claim 11, wherein the background voice providing device is further configured to:

send a second request message to the voice message server, the second request message configured to request to establish a call between the third user equipment and the voice message server; and send a third request message to the third user equipment, the third request message configured to request to establish a call between the voice message server and the third user equipment, if the second user equipment is on the call with the first user equipment.

13. A first providing device according to claim 10, further comprising:

a first determining device, configured to determine whether the second user equipment subscribes to a service for receiving the voice message from the third user equipment when the second user equipment is on the call with the first user equipment; and if the second user equipment subscribes to the service, the background voice providing device executing the providing operation.

14. A second providing device in a voice message server in telecommunication networks, for providing a second user equipment which is on a call with a first user equipment with a background voice message from a third user equipment, comprising:

a second receiving device, configured to receive a request message from a call controlling device, the request message configured to request to establish a call between the voice message server and the third user equipment; and a second sending device, configured to send another request message to the second user equipment, the other request message configured to request to establish a call between the voice message server and the second user equipment.

15. A second providing device according to claim 14, further comprising:

a second determining device, configured to determine whether the second user equipment subscribes to a service for receiving the voice message from the third user equipment when the second user equipment is on the call with the first user equipment; and if the second user equipment subscribes to the service, the second sending device executing the sending operation.

* * * * *